(12) United States Patent
Park

(10) Patent No.: US 12,197,779 B2
(45) Date of Patent: Jan. 14, 2025

(54) HOST DEVICE FOR DEBUGGING STORAGE DEVICE AND STORAGE SYSTEM INCLUDING THE SAME

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/473,275

(22) Filed: Sep. 25, 2023

(65) Prior Publication Data

US 2024/0329876 A1 Oct. 3, 2024

(30) Foreign Application Priority Data

Apr. 3, 2023 (KR) ........................ 10-2023-0043586

(51) Int. Cl.
*G06F 3/06* (2006.01)
(52) U.S. Cl.
CPC .......... *G06F 3/0658* (2013.01); *G06F 3/0619* (2013.01); *G06F 3/0656* (2013.01); *G06F 3/0679* (2013.01)
(58) Field of Classification Search
CPC .... G06F 3/0658; G06F 3/0619; G06F 3/0656; G06F 3/0679
See application file for complete search history.

(56) References Cited

U.S. PATENT DOCUMENTS

| 2017/0123658 A1* | 5/2017 | Suh ................... G06F 9/30036 |
| 2017/0271028 A1* | 9/2017 | Rigal .................... G11C 29/38 |

FOREIGN PATENT DOCUMENTS

| KR | 10-2017-0052382 A | 5/2017 |
| KR | 10-2017-0109501 A | 9/2017 |

* cited by examiner

*Primary Examiner* — Curtis James Kortman
(74) *Attorney, Agent, or Firm* — IP & T GROUP LLP

(57) ABSTRACT

Provided herein may be a host device for debugging a storage device and a storage system including the same. The storage system may include a memory controller including a buffer memory including a plurality of slots, and a map storage configured to store map information including physical addresses of slots allocated to a plurality of logical addresses, respectively, and a host device configured to store backup information including first data read from slots allocated to the logical addresses, select, after storage of the backup information, at least two logical addresses having an identical offset among offset values corresponding to second data read from the slots allocated to the addresses, and control the memory controller to store at least two pieces of first data respectively corresponding to the at least two logical addresses in at least two different slots based on the backup information.

14 Claims, 5 Drawing Sheets

HOST DEVICE FOR DEBUGGING STORAGE DEVICE AND STORAGE SYSTEM INCLUDING THE SAME

CROSS-REFERENCE TO RELATED APPLICATION

The present application claims priority under 35 U.S.C. § 119(a) to Korean patent application number 10-2023-0043586 filed on Apr. 3, 2023, the entire disclosure of which is incorporated by reference herein.

BACKGROUND

1. Field of Invention

Various embodiments of the present disclosure relate to an electronic device, and more particularly to a host device for debugging a storage device and a storage system including the host device.

2. Description of Related Art

A storage device stores data or provides data to a host device according to a request from the host device. The storage device may include a buffer which temporarily stores data. The buffer may distribute and store data in units of segments using a scatter gather buffer manager (SGBM) scheme, and may process the distributed data as one piece of continuous data. However, during runtime, a bug such as a case where different virtual addresses indicate a physical address of the same segment may occur. Accordingly, due to the characteristics of SGBM scheme which is used and restored for a short period of time, a scheme for performing debugging in real time during runtime is needed.

SUMMARY

Various embodiments of the present disclosure are directed to a host device that is capable of debugging a storage device and a storage system including the host device.

An embodiment of the present disclosure may provide for a storage system. The storage system may include a memory controller including a buffer memory including a plurality of slots, and a map storage configured to store map information including physical addresses of slots allocated to a plurality of logical addresses, respectively, and a host device configured to store backup information including pieces of first data read from slots allocated to the plurality of logical addresses, respectively, select, after storage of the backup information, at least two logical addresses having an identical offset among offset values corresponding to pieces of second data read from the slots allocated to the plurality of logical addresses, respectively, and control the memory controller to store at least two pieces of first data respectively corresponding to the at least two logical addresses in at least two different slots based on the backup information.

An embodiment of the present disclosure may provide for a host device. The host device may include a communication interface coupled to a memory controller including a buffer memory, a map storage, and a debug interface, through the debug interface, wherein the buffer memory includes a plurality of slots, and the map storage is configured to store map information including physical addresses of slots allocated to a plurality of logical addresses, respectively, a host memory device configured to store backup information including pieces of first data read from slots allocated to the plurality of logical addresses, respectively, and a processor configured to select, after storage of the backup information, at least two logical addresses having an identical offset among offset values corresponding to pieces of second data read from the slots allocated to the plurality of logical addresses, respectively, and control, through the communication interface, the memory controller to store at least two pieces of first data respectively corresponding to the at least two logical addresses in at least two different slots based on the backup information.

An embodiment of the present disclosure may provide for a method of operating a storage system. The method may include storing backup information including pieces of first data read from slots allocated to a plurality of logical addresses, respectively, among a plurality of slots included in a buffer memory of the memory controller, selecting at least two logical addresses having an identical offset among offset values corresponding to pieces of second data read from the slots allocated to the plurality of logical addresses, respectively, and controlling the memory controller to store at least two pieces of first data respectively corresponding to the at least two logical addresses in at least two different slots based on the backup information.

DETAILED DESCRIPTION

Specific structural or functional descriptions of the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification. Terms such as "first" and "second" in the accompanying claims and the detailed description of the present disclosure may be only used for the purpose of differentiating a component from other components, but they should not limit the various components.

Figure 1:
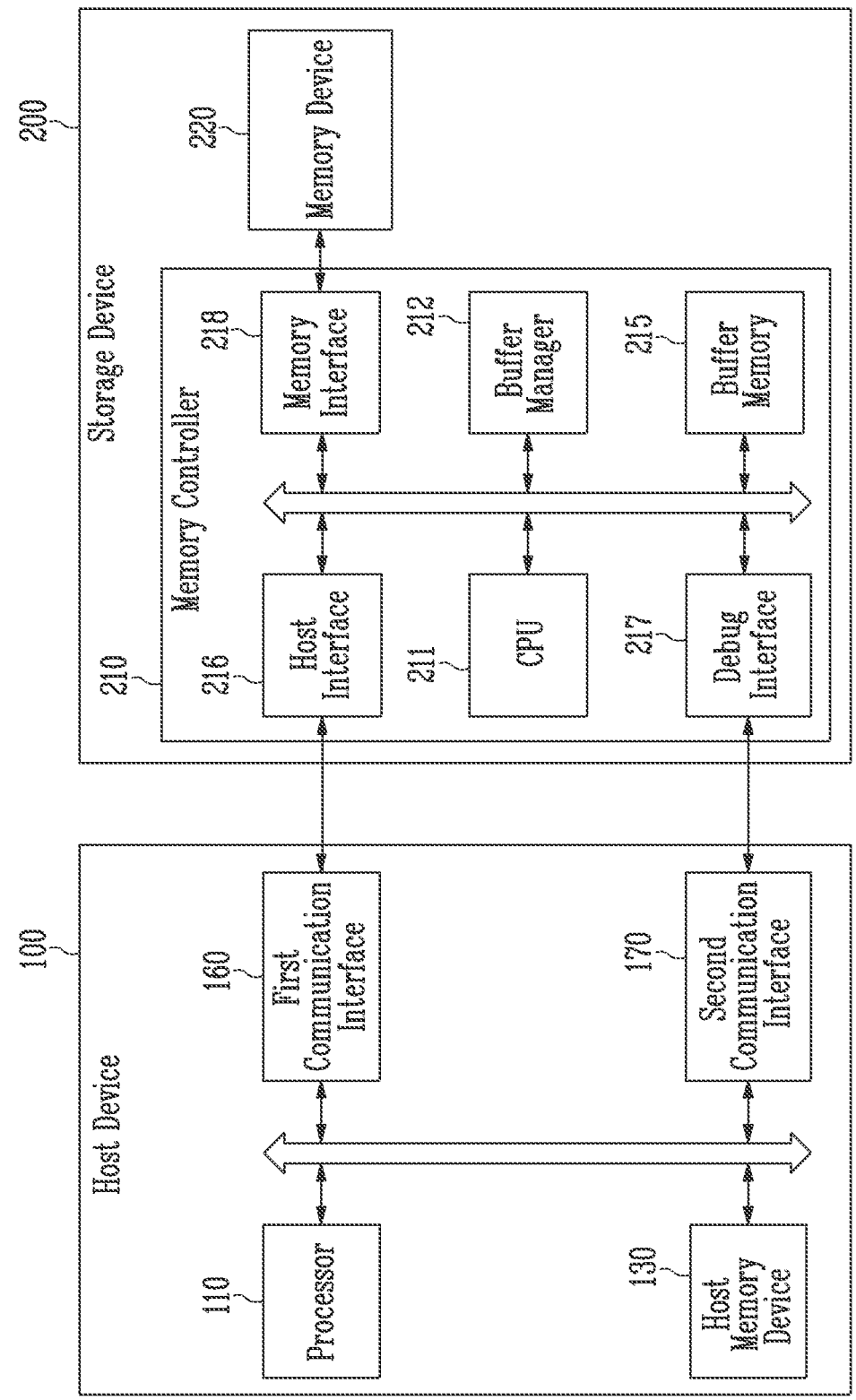
FIG. 1 is a diagram illustrating a storage system according to an embodiment of the present disclosure.

FIG. 1 is a diagram illustrating a storage system 10 according to an embodiment of the present disclosure.

Referring to FIG. 1, the storage system 10 may include a host device 100 and a storage device 200. For example, the host device 100 may be any of various electronic devices such as a computer, a smartphone, a tablet computer, a robot, an Internet-of-Things (IoT) device, a set-top box, a game console, a Television (TV), a vehicle, an artificial intelligence speaker, a wearable device, and a server. For example, the storage device 200 may be implemented as a solid state drive (or a solid state disk) (SSD) device, a secure digital (SD) card device, a mini-SD card device, a micro-SD card device, a multimedia card (MMC) device, an embedded MMC (eMMC) device, a universal serial bus (USB) storage device, a universal flash storage (UFS) device, a network-attached storage (NAS) or a direct-attached storage (DAS). Moreover, the above-enumerated examples are only embodiments, and the present disclosure may be applied to various electronic devices.

In an embodiment, the storage device 200 may include a memory controller 210 and a memory device 220. The memory controller 210 may control the operation of the memory device 220.

The memory device 220 may store data or may read out the stored data. In an embodiment, the memory device 220 may include a plurality of pages. One page may include a plurality of memory cells. Each memory cell may be implemented as any of various types of nonvolatile memory elements. For example, the memory cell may be implemented as a NAND flash memory, a NOR flash memory, or the like.

In an embodiment, the memory controller 210 may include a central processing unit (CPU) 211, a buffer manager 212, a buffer memory 215, a host interface 216, a debug interface 217, and a memory interface 218.

The CPU 211 may control operations of components included in the memory controller 210. The CPU 211 may control the memory device 220 to perform an operation corresponding to a request according to a request received from the host device 100.

In an embodiment, the host interface 216 may receive a write request, a logical address, and write data from the host device 100. In this case, the CPU 211 may translate the logical address into a physical address corresponding thereto, and may generate a program command corresponding to the write request. Here, the physical address may indicate the storage area (e.g., a page or the like) of the memory device 220. In an embodiment, the write data may be stored in the buffer memory 215. Furthermore, the CPU 211 may control the memory interface 218 and the buffer memory 215 to transmit the program command, the physical address, and the write data to the memory device 220.

In an embodiment, the host interface 216 may receive a read request and a logical address from the host device 100. In this case, the CPU 211 may translate the logical address into a physical address corresponding thereto, and may generate a read command corresponding to the read request. The CPU 211 may control the memory interface 218 to transmit the read command and the physical address to the memory device 220. In this case, the memory interface 218 may receive read data from the memory device 220. In an embodiment, the read data may be stored in the buffer memory 215. Further, the CPU 211 may control the host interface 216 and the buffer memory 215 to transmit the read data to the host device 100.

The buffer manager 212 may manage or control the buffer memory 215. The buffer memory 215 may temporarily store data when the data is exchanged between the memory device 220 and the host device 100. For example, the buffer memory 215 may be implemented as a dynamic random access memory (DRAM), a static RAM (SRAM), a phase-change RAM (PRAM), a magnetic RAM (MRAM), a resistive RAM (ReRAM), a ferroelectric RAM (FRAM) or the like. In an embodiment, the buffer memory 215 may have performance of a storage speed or a read speed higher than that of the memory device 220.

In an embodiment, the buffer manager 212 may allocate a logical address to an area of the buffer memory 215. The buffer manager 212 may store data corresponding to the logical address in the area to which the logical address is allocated. For example, the buffer memory 215 may temporarily store write data received from the host device 100 through the host interface 216. For example, the buffer memory 215 may temporarily store read data received from the memory device 220 through the memory interface 218.

The host interface 216 may perform communication for operation control or data transmission/reception with the host device 100. The debug interface 217 may perform communication for performing a debugging function with the host device 100. The memory interface 218 may perform communication for operation control or data transmission/reception with the memory device 220. For example, the memory interface 218 may transmit a program command, a physical address, and write data to the memory device 220. The memory interface 218 may transmit a read command and a physical address to the memory device 220, and may receive read data from the memory device 220.

In an embodiment, the host device 100 may include a processor 110, a host memory device 130, a first communication interface 160, and a second communication interface 170.

The first communication interface 160 may be coupled to the host interface 216 of the storage device 200. The first communication interface 160 and the host interface 216 may perform communication with each other in compliance with various communication standards. For example, the first communication interface 160 and the host interface 216 may perform communication in compliance with any of various communication standards or interfaces, such as peripheral component interconnection (PCI), PCI-express (PCI-E), advanced technology attachment (ATA), serial-ATA (SATA), parallel-ATA (PATA), universal serial bus (USB), small computer system interface (SCSI), enhanced small disk interface (ESDI), integrated drive electronics (IDE), Firewire, universal flash storage (UFS), universal asynchronous receiver/transmitter (UART), and Thunderbolt.

The processor 110 may control the storage device 200 to store data or read data through the first communication interface 160. For example, the first communication interface 160 may transmit a write request, a logical address, and write data to the host interface 216. The first communication interface 160 may transmit a read request and a logical address to the host interface 216, and may receive read data from the host interface 216.

The second communication interface 170 of the host device 100 may be coupled to the debug interface 217 of the storage device 200. For example, the second communication interface 170 and the debug interface 217 may perform communication with each other in compliance with any of various communication standards such as joint test action group (JTAG), compact JTAG (CJTAG), and serial wire debug (SWD). For example, JTAG may be a scheme in which output data is transmitted or input data is received through a serial communication method so as to implement digital input/output for a specific node in a digital circuit.

In an embodiment, the second communication interface 170 and the debug interface 217 may be coupled to each other through an external debug device. In this case, the second communication interface 170 and the debug device may perform communication through a first communication standard, and the debug device and the debug interface 217 may perform communication through a second communication standard. For example, the first communication standard may be a USB communication standard, and the second communication standard may be a JTAG communication standard. However, this is only an embodiment, and the first communication standard and the second communication standard may be modified and practiced in various forms.

In an embodiment, the second communication interface 170 and the debug interface 217 may transmit and receive at least one of a logical address and data required for a backup operation, a recovery operation or the like.

The processor 110 may transmit/receive data for performing a debugging function on the storage device 200 through the second communication interface 170. Here, the debugging function may include a function of controlling or managing the operation of the memory controller 210 or the internal data of the memory controller 210 regardless of the CPU 211 or the buffer manager 212 of the memory controller 210. For example, the processor 110 may control the second communication interface 170 to transmit a request for suspending or resuming the operation of the memory controller 210 to the memory controller 210. The processor 110 may control the second communication interface 170 so that a request for performing control so as to read or change data stored in the memory controller 210 is transmitted to the memory controller 210.

The host memory device 130 may store backup information. The backup information may include data received through the second communication interface 170. The host memory device 130 may be a volatile memory, or alternatively, may be implemented as a nonvolatile memory. For example, the host memory device 130 may be implemented as a DRAM, SRAM, PRAM, MRAM, ReRAM, or FRAM. In an embodiment, the host memory device 130 may store at least one of an instruction to be executed by the processor 110 and data calculated by the processor 110.

In accordance with an embodiment of the present disclosure, a mapping error in which the buffer memory 215 is redundantly allocated may be detected during the runtime of the memory controller 210, and the mapping error may be recovered. Details thereof will be described below with reference to the attached drawings.

Figure 2:
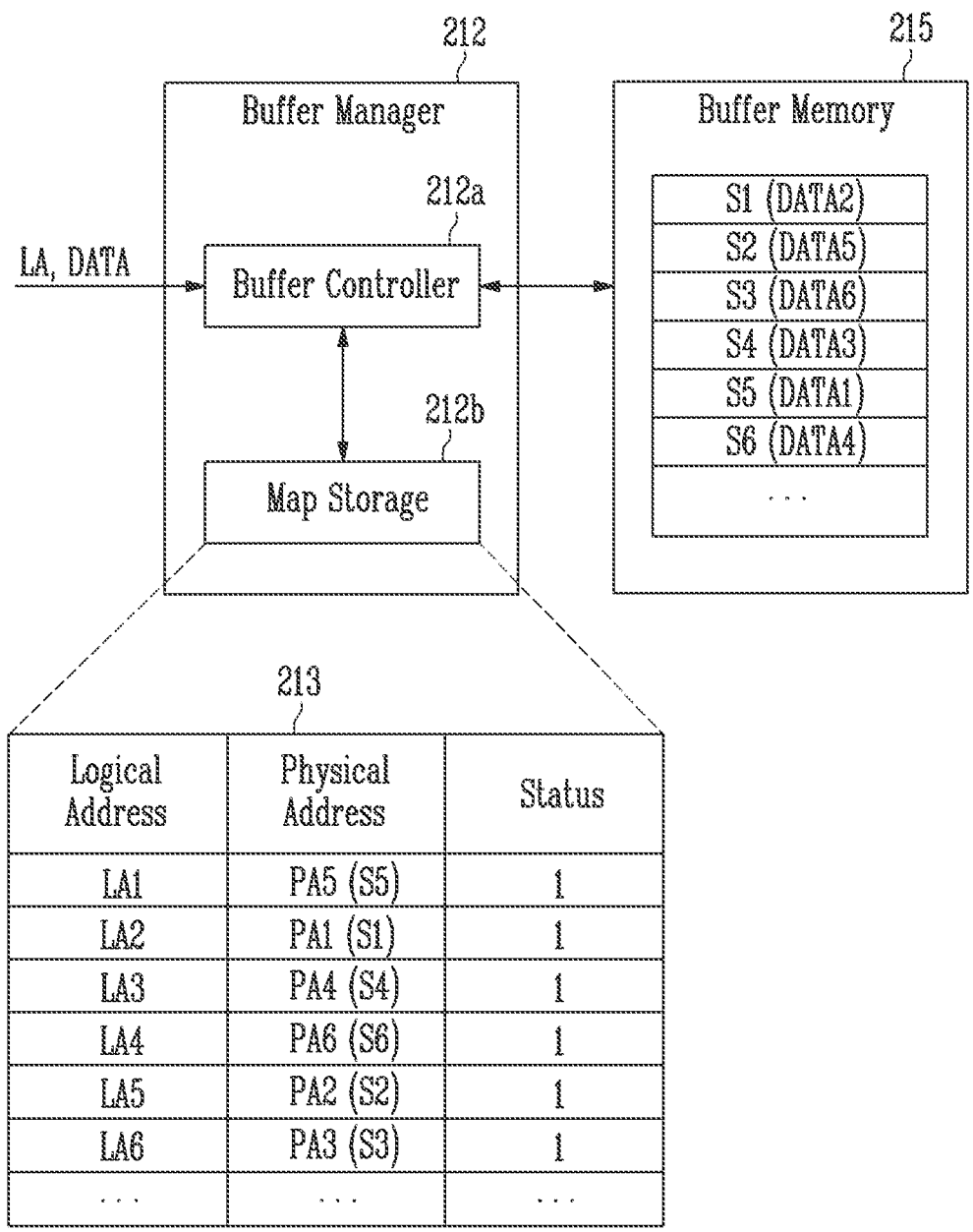
FIG. 2 is a detailed diagram illustrating a buffer manager and a buffer memory of a memory controller according to an embodiment of the present disclosure.

FIG. 2 is a detailed diagram illustrating the buffer manager 212 and the buffer memory 215 of the memory controller 210 according to an embodiment of the present disclosure.

Referring to FIG. 2, the buffer manager 212 may include a buffer controller 212a and a map storage 212b.

The buffer controller 212a may separate the buffer memory 215 into a plurality of slots S1 to S6 and manage the slots. That is, the buffer memory 215 may include the plurality of slots S1 to S6. The reason for this is to efficiently use the buffer memory 215 by dividing the buffer memory 215 into specific units and store data in the buffer memory 215 in a distributed manner. For example, when the buffer memory 215 is a memory having a total storage capacity of 6 MB, each of the slots S1 to S6 may be a memory element having a storage capacity of 1 MB. However, this is only an embodiment, and each of the slots S1 to S6 may be modified and practiced into memory elements having different capacities.

When a logical address LA and data DATA corresponding to the logical address LA are received, the buffer controller 212a may allocate the logical address LA to a slot selected from among the plurality of slots S1 to S6, and may store the data DATA in the slot to which the logical address LA is allocated.

For example, when a first logical address LA1 and the first data DATA1 corresponding to the first logical address LA1 are received, the buffer controller 212a may select an arbitrary slot being in an inactive state from among the plurality of slots S1 to S6 of the buffer memory 215. When the fifth slot S5 being in an inactive state is selected, the buffer controller 212a may allocate the first logical address LA1 to the selected fifth slot S5, and may store the first data DATA1 in the fifth slot S5.

The buffer controller 212a may store map information 213, including a physical address of the slot to which the logical address LA is allocated, in the map storage 212b. The map information 213 may include logical addresses LA, physical addresses, status information, and information about correspondence between them. The logical addresses LA may be virtual addresses set by the host device 100. The physical addresses may be identifiers for identifying slots. The value of the status information may indicate an activate state or an inactive state. For example, the first value (e.g., 1) of the status information may indicate an active state, and the second value (e.g., 0) of the status information may indicate an inactive state. The active state may be the state in which valid data is stored in the corresponding slot, and the inactive state may be the state in which valid data is not stored in the corresponding slot.

For example, when the first logical address LA1, the fifth physical address PA5, and the status information of the first value (e.g., 1), which have a corresponding relationship thereamong, are included in the map information 213, the map information 213 may represent information indicating that the first logical address LA1 has been allocated to the fifth slot S5 indicated by the fifth physical address PA5. In an embodiment, a logical address LA, the physical address of a slot, and status information, which are located in the same row (or column) in the map information 213, may have a corresponding relationship thereamong.

When data stored in the slot of the buffer memory 215 is output to the host device or the memory device, the buffer controller 212a may delete data stored in the corresponding slot. In this case, the buffer controller 212a may update the map information 213 by changing the status information of the corresponding slot to the second value (e.g., 0). Thereafter, when a new logical address is received, the buffer controller 212a may allocate a new logical address to a slot having status information of the second value (e.g., 0).

According to an embodiment, during a process of allocating a logical address to the slot of the buffer memory 215, a mapping error in which a plurality of logical addresses are redundantly allocated to the same slot may occur. According to the present disclosure, a mapping error may be detected during runtime by utilizing the offset of the data read from the corresponding slot. Further, the mapping error may be corrected through a backup operation and a recovery operation.

Figure 3A:
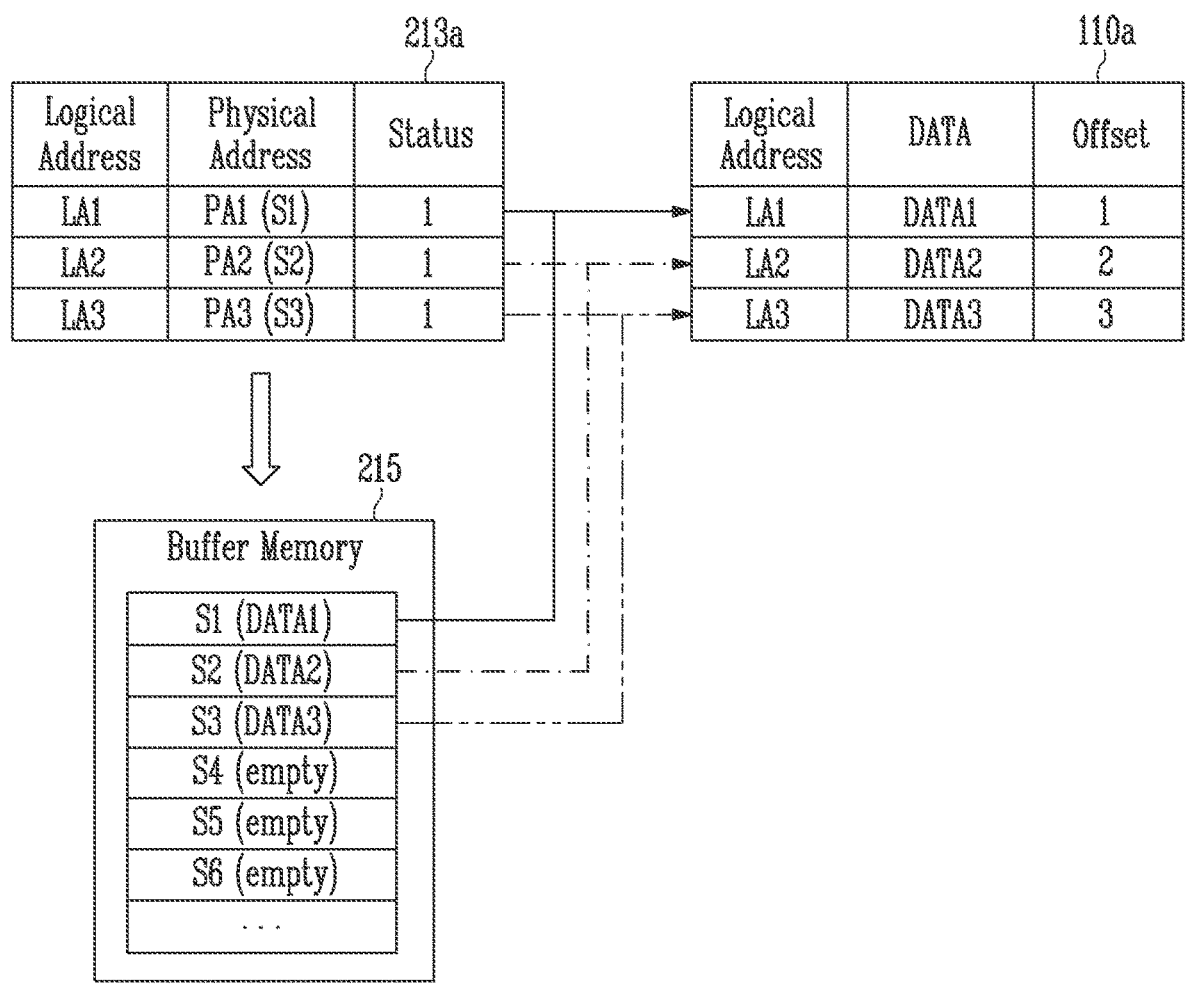
FIG. 3A is a diagram for describing a backup operation according to an embodiment of the present disclosure.

FIG. 3A is a diagram for describing a backup operation according to an embodiment of the present disclosure.

Referring to FIG. 3A, the processor 110 of the host device 100 shown in FIG. 1 may perform a backup operation of storing backup information 110a in the host memory device 130 based on map information 213a and pieces of data DATA1 to DATA3 stored in the buffer memory 215. The backup information 110a may include logical addresses LA1 to LA3 and the pieces of data DATA1 to DATA3. The pieces of data DATA1 to DATA3 may be pieces of data read from the slots S1 to S3 of the buffer memory 215 allocated to the logical addresses LA1 to LA3. In an embodiment, the backup information 110a may further include unique offset values corresponding to the logical addresses LA1 to LA3, respectively. For example, respective unique offset values may be different values.

In a detailed embodiment, the processor 110 may control the memory controller 210 to suspend an operation being performed through the second communication interface 170. The processor 110 may access the map information 213a through the second communication interface 170. The processor 110 may select logical addresses LA1 to LA3 having status information of a first value (e.g., 1) from the map information 213a, and may access the slots S1 to S3 of the buffer memory 215 to which the selected logical addresses LA1 to LA3 are allocated. The processor 110 may obtain the pieces of data DATA1 to DATA3 stored in the slots S1 to S3 of the buffer memory 215 through the second communication interface 170.

In this case, the processor 110 may store the backup information 110a, including the logical addresses LA1 to LA3 and the pieces of data DATA1 to DATA3, in the host memory device 130.

In an embodiment, the processor 110 may store the backup information 110a, further including unique offset values respectively corresponding to the logical addresses LA1 to LA3, in the host memory device 130.

In detail, the processor 110 may generate a first unique offset value corresponding to the first logical address LA1 or the first data DATA1, and may record the first unique offset value in the backup information 110a. Here, the first data DATA1 refers to data obtained from the first slot S1 to which the first logical address LA1 is allocated. In this way, the processor 110 may generate a second unique offset value corresponding to the second logical address LA2 or the second data DATA2, and may generate a third unique offset value corresponding to the third logical address LA3 or the third data DATA3.

The processor 110 may generate the first to third unique offset values so that the first to third unique offset values are different values. As an example, the first logical address LA1 is 0x8000_0000, the second logical address LA2 is 0x8000_0001, and the third logical address LA3 is 0x8000_0002. In an embodiment, the processor 110 may generate the first to third unique offset values so that the first unique offset value is 1, the second unique offset value is 2, and the third unique offset value is 3. That is, the logical addresses and the unique offset values corresponding thereto may have different values. In an embodiment, the processor 110 may generate the first to third unique offset values so that the first unique offset value is 0x8000_0000, the second unique offset value is 0x8000_0001, and the third unique offset value is 0x8000_0002. That is, each logical address and a unique offset value corresponding thereto may have an identical value.

Figure 3B:
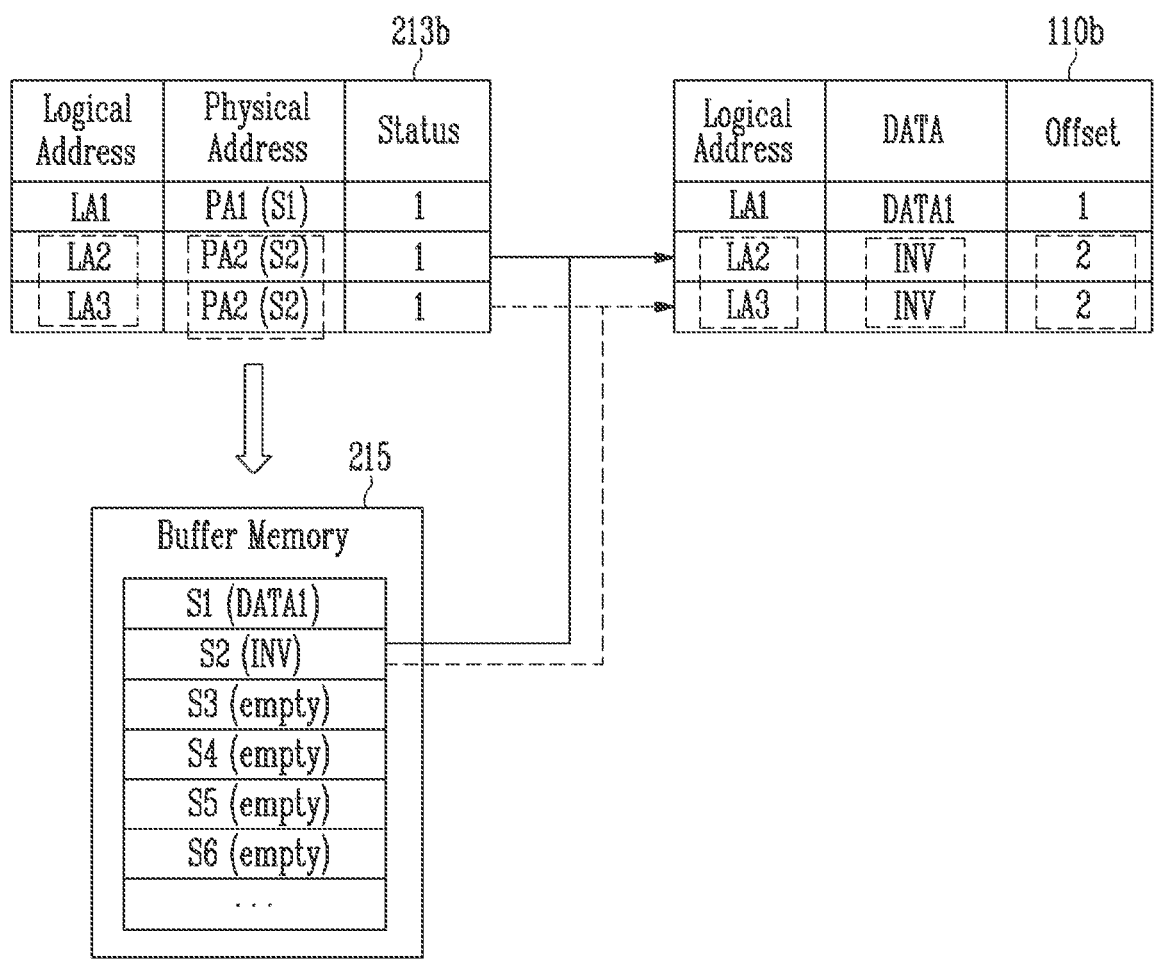
FIG. 3B is a diagram for describing a mapping error detection operation according to an embodiment of the present disclosure.

FIG. 3B is a diagram for describing a mapping error detection operation according to an embodiment of the present disclosure.

Referring to FIG. 3B, the processor 110 may detect a mapping error using offset values corresponding to data DATA1 and INV read from slots S1 and S2 of the buffer memory 215 respectively allocated to a plurality of logical addresses LA1 to LA3.

For example, description will be made on that the second logical address LA2 and the third logical address LA3 are redundantly allocated to the second slot S2, among the plurality of slots S1 to S6 of the buffer memory 215. Redundant allocation of logical addresses may occur after a backup operation is performed.

In an embodiment, the processor 110 may access map information 213b through the second communication interface 170. The processor 110 may select logical addresses LA1 to LA3 having status information of a first value (e.g., 1) from the map information 213b, and may access the slots S1 and S2 of the buffer memory 215 to which the selected logical addresses LA1 to LA3 are allocated. The processor 110 may obtain the pieces of data DATA1 and INV stored in the slots S1 and S2 of the buffer memory 215 through the second communication interface 170. The processor 110 may obtain offset information 110b including the logical addresses LA1 to LA3, the data DATA1 and INV, and offset values corresponding to the DATA1 and INV.

For example, the processor 110 may obtain first data DATA1 stored in the first slot S1 of the buffer memory 215 to which the first logical address LA1 is allocated, and may generate a first offset value (e.g., 1) corresponding to the first data DATA1 of the first logical address LA1.

For example, the processor 110 may obtain redundant data INV stored in the second slot S2 of the buffer memory 215 to which the second logical address LA2 is allocated, and may generate a second offset value (e.g., 2) corresponding to the redundant data INV of the second logical address LA2. In this case, because the redundant data INV and the first data DATA1 are different types of data, the first offset value of the first logical address LA1 and the second offset value of the second logical address LA2 may be different values.

Furthermore, the processor 110 may obtain the redundant data INV stored in the second slot S2 of the buffer memory 215 to which the third logical address LA3 is allocated. The processor 110 may generate a third offset value (e.g., 2) corresponding to the redundant data INV of the third logical address LA3. In this case, because the redundant data INV of the second logical address LA2 and the redundant data INV of the third logical address LA3 are the same data, the second offset value of the second logical address LA2 and the third offset value of the third logical address LA3 may be the same value.

The processor 110 may select the same offset value from among the offset values included in the offset information 110b, and may select the second logical address LA2 and the third logical address LA3 corresponding to the same offset value. That is, it may be detected that a mapping error has occurred in the second logical address LA2 and the third logical address LA3 having the same offset value.

Figure 3C:
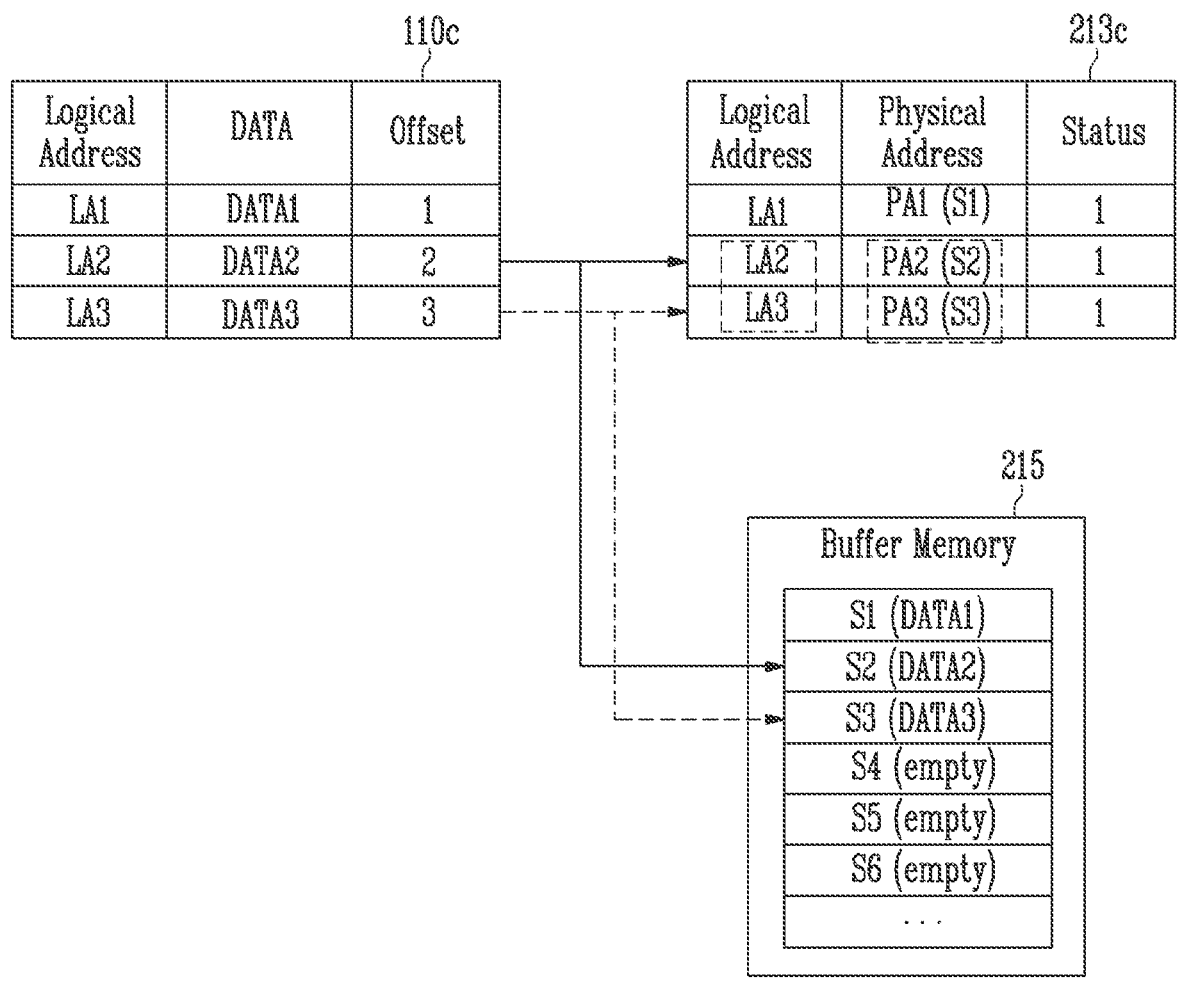
FIG. 3C is a diagram for describing a recovery operation according to an embodiment of the present disclosure.

FIG. 3C is a diagram for describing a recovery operation according to an embodiment of the present disclosure.

Referring to FIG. 3C, the processor 110 may correct a mapping error by performing a recovery operation on at least two logical addresses in which the mapping error has occurred, based on backup information 110c. As an example, description will be made on that a recovery operation is performed when it is detected that the second logical address LA2 and the third logical address LA3 are redundantly allocated to the second slot S2 among the plurality of slots S1 to S6 of the buffer memory 215, as illustrated in FIG. 3B.

In an embodiment, the processor 110 may control the memory controller 210 so that, based on backup information 110c, at least two pieces of data DATA2 and DATA3 respectively corresponding to at least two logical addresses LA2 and LA3 are stored in at least two different slots S2 and S3. Here, the backup information 110c may include a plurality of logical addresses LA1 to LA3, pieces of data DATA1 to DATA3 respectively corresponding to the plurality of logical addresses LA1 to LA3, and unique offset values respectively corresponding to the logical addresses LA1 to LA3. The backup information 110c may be stored in the host memory device 130 of the host device 100 before a mapping error occurs. The at least two logical addresses LA2 and LA3 may be logical addresses at which a mapping error has occurred. The at least two pieces of data DATA2 and DATA3 refer to pieces of data corresponding to the at least two logical addresses LA2 and LA3 among pieces of data included in the backup information 110c. The at least two slots S2 and S3 may be different slots. That is, a logical address, data, and a slot may have a one-to-one correspondence.

In an embodiment, the processor 110 may select at least two pieces of data DATA2 and DATA3 respectively corresponding to the at least two logical addresses LA2 and LA3 from the backup information 110c. Here, the selected at least two pieces of data DATA2 and DATA3 may refer to data to be recovered in the buffer memory 215.

In an embodiment, the processor 110 may control the memory controller 210 so that at least two pieces of data DATA2 and DATA3 are divided and separately stored in the at least two slots S2 and S3. For example, the second data DATA2 may be stored in the second slot S2, and the third data DATA3 may be stored in the third slot S3. However, this is only an embodiment, and slots in which pieces of data are to be stored may be modified in various forms.

In an embodiment, the processor 110 may select at least two unique offset values respectively corresponding to the at least two logical addresses LA2 and LA3 from the backup information 110c. The processor 110 may select at least two slots S2 and S3 corresponding to the at least two unique offset values from among the plurality of slots S1 to S6. Here, each unique offset value may correspond to one specific slot. For example, unique offset values may be addresses in another system, different from the physical addresses of slots managed in the memory controller 210.

In an embodiment, the processor 110 may access at least two slots S2 and S3 respectively corresponding to at least two offsets through the second communication interface 170, and may divide and separately store at least two pieces of data DATA2 and DATA3 in the at least two slots S2 and S3. In an embodiment, the processor 110 may update map information 213c so that the physical addresses PA2 and PA3 of the at least two slots S2 and S3 are allocated to at least two logical addresses LA2 and LA3, respectively, through the second communication interface 170.

In an embodiment, the processor 110 may control the second communication interface 170 to transmit at least two pieces of data DATA2 and DATA3 and at least two offsets. In this case, when the at least two pieces of data DATA2 and DATA3 and the at least two offsets are received through the debug interface 217, the buffer controller 212a of the memory controller 210 may divide and separately store the at least two pieces of data DATA2 and DATA3 in the at least two slots S2 and S3 respectively corresponding to the at least two offsets.

In an embodiment, the processor 110 may select at least two pieces of data DATA2 and DATA3 respectively corresponding to the at least two logical addresses LA2 and LA3 from the backup information 110c. The processor 110 may control the second communication interface 170 to transmit the at least two logical addresses LA2 and LA3 and the at least two pieces of data DATA2 and DATA3 to the memory controller 210.

In this case, when the at least two logical addresses LA2 and LA3 and the at least two pieces of data DATA2 and DATA3 are received through the debug interface 217, the buffer controller 212a may select at least two slots S2 and S3 being in an inactive state from among the plurality of slots S1 to S6. The buffer controller 212a may allocate the at least two slots S2 and S3 to the at least two logical addresses LA2 and LA3, respectively. The buffer controller 212a may divide and separately store the at least two pieces of data DATA2 and DATA3 in the at least two slots S2 and S3. In this case, the buffer controller 212a may update the map information 213c so that physical addresses of the at least two slots S2 and S3 are allocated to the at least two logical addresses LA2 and LA3.

According to the present disclosure, there can be provided a host device that debugs a storage device and a storage system including the host device. According to the present disclosure, a redundant mapping issue occurring in a buffer memory included in a storage device may be resolved.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A storage system comprising:
   a memory controller including:
      a buffer memory including a plurality of slots, and
      a map storage configured to store map information including physical addresses of slots allocated to a plurality of logical addresses, respectively; and
   a host device configured to:
      store backup information including pieces of first data read from slots allocated to the plurality of logical addresses, respectively, select, after storage of the backup information, at least two logical addresses having an identical offset among offset values corresponding to pieces of second data read from the slots allocated to the plurality of logical addresses, respectively, and
      control the memory controller to store at least two pieces of first data respectively corresponding to the at least two logical addresses in at least two different slots based on the backup information.

2. The storage system according to claim 1, wherein the backup information further includes unique offset values respectively corresponding to the plurality of logical addresses, and
   wherein the host device is configured to control the memory controller to:
      select the at least two pieces of first data and at least two unique offset values that respectively correspond to the at least two logical addresses from the backup information, and
      divide and separately store the at least two pieces of first data in the at least two slots respectively corresponding to the at least two unique offset values.

3. The storage system according to claim 2, wherein the host device is configured to update the map information so that the physical addresses of the at least two slots are allocated to the at least two logical addresses, respectively.

4. The storage system according to claim 1, wherein the host device is configured to:
   select the at least two pieces of first data respectively corresponding to the at least two logical addresses from the backup information, and
   transmit the at least two logical addresses and the at least two pieces of first data to the memory controller.

5. The storage system according to claim 4, wherein the memory controller further comprises:
   a buffer controller configured to, when the at least two logical addresses and the at least two pieces of first data are received, divide and separately store the at least two pieces of first data in the at least two slots respectively corresponding to the at least two logical addresses among the plurality of slots.

6. The storage system according to claim 5, wherein the buffer controller is configured to, when the at least two logical addresses and the at least two pieces of first data are received, update the map information so that physical addresses of the at least two slots are allocated to the at least two logical addresses, respectively.

7. The storage system according to claim 1, wherein the memory controller further comprises:
a debug interface configured to communicate with the host device using a joint test action group (JTAG) scheme.

8. The storage system according to claim 7, wherein the host device is configured to receive at least one of the plurality of logical addresses, the pieces of first data, and the pieces of second data through a communication interface coupled to the debug interface.

9. A host device comprising:
a communication interface coupled to a memory controller including a buffer memory, a map storage, and a debug interface, through the debug interface, wherein the buffer memory includes a plurality of slots, and the map storage is configured to store map information including physical addresses of slots allocated to a plurality of logical addresses, respectively;
a host memory device configured to store backup information including pieces of first data read from slots allocated to the plurality of logical addresses, respectively; and
a processor configured to:
select, after storage of the backup information, at least two logical addresses having an identical offset among offset values corresponding to pieces of second data read from the slots allocated to the plurality of logical addresses, respectively, and
control, through the communication interface, the memory controller to store at least two pieces of first data respectively corresponding to the at least two logical addresses in at least two different slots based on the backup information.

10. The host device according to claim 9, wherein:
the backup information further includes unique offset values respectively corresponding to the plurality of logical addresses, and
the processor is configured to:
select the at least two pieces of first data and at least two unique offset values that respectively correspond to the at least two logical addresses from the backup information, and
control the communication interface to transmit, to the memory controller, a request for dividing and separately storing the at least two pieces of first data in the at least two slots respectively corresponding to the at least two unique offset values.

11. The host device according to claim 9, wherein the processor is configured to control the communication interface to transmit, to the memory controller, a request for controlling update of the map information so that physical addresses of the at least two slots are allocated to the at least two logical addresses, respectively.

12. The host device according to claim 9, wherein the communication interface is coupled to the debug interface through a joint test action group (JTAG)-type debug device.

13. The host device according to claim 12, wherein the processor is configured to receive at least one of the plurality of logical addresses, the pieces of first data, and the pieces of second data through the communication interface.

14. A method of operating a storage system, the method comprising:
storing backup information including pieces of first data read from slots allocated to a plurality of logical addresses, respectively, among a plurality of slots included in a buffer memory of the memory controller;
selecting at least two logical addresses having an identical offset among offset values corresponding to pieces of second data read from the slots allocated to the plurality of logical addresses, respectively; and
controlling the memory controller to store at least two pieces of first data respectively corresponding to the at least two logical addresses in at least two different slots based on the backup information.

* * * * *